US012608902B2

(12) United States Patent
Miller et al.

(10) Patent No.: US 12,608,902 B2
(45) Date of Patent: Apr. 21, 2026

(54) OCCLUSION CLASSIFICATION AND FEEDBACK

(71) Applicant: Apple Inc., Cupertino, CA (US)

(72) Inventors: Brett D. Miller, San Carlos, CA (US); Daniel K. Boothe, San Francisco, CA (US); Martin E. Johnson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 18/211,518

(22) Filed: Jun. 19, 2023

(65) Prior Publication Data

US 2023/0410458 A1    Dec. 21, 2023

Related U.S. Application Data

(60) Provisional application No. 63/354,023, filed on Jun. 21, 2022.

(51) Int. Cl.
| | |
|---|---|
| *G06V 10/26* | (2022.01) |
| *G06F 3/16* | (2006.01) |
| *G06V 10/764* | (2022.01) |
| *G06V 10/82* | (2022.01) |

(52) U.S. Cl.
CPC ............. *G06V 10/26* (2022.01); *G06F 3/167* (2013.01); *G06V 10/764* (2022.01); *G06V 10/82* (2022.01)

(58) Field of Classification Search
CPC ...... G06V 10/26; G06V 10/764; G06V 10/82; G06V 10/94; G06F 3/167; G06F 1/163;

G06F 1/1686; G06F 3/017; G06F 3/011; G02B 27/0172; G02B 2027/0138; G02B 2027/014; H04N 23/698; H04N 23/90
USPC .......................................................... 382/224
See application file for complete search history.

(56) References Cited

U.S. PATENT DOCUMENTS

| | | | |
|---|---|---|---|
| 9,253,375 | B2 | 2/2016 | Milanfar et al. |
| 10,376,153 | B2 | 8/2019 | Tzvieli et al. |
| 11,085,613 | B2 | 8/2021 | Moghal et al. |
| 2018/0341329 | A1 | 11/2018 | San Agustin Lopez |
| 2019/0294999 | A1* | 9/2019 | Guttmann ............. G06F 18/217 |
| 2023/0177839 | A1* | 6/2023 | Bajpayee ............... G06F 18/213 |
| 2023/0300532 | A1* | 9/2023 | Spittle ..................... G06F 3/165 |
| | | | 381/1 |

FOREIGN PATENT DOCUMENTS

CA           3029410 A1 *  1/2018  ............. G06T 11/00

* cited by examiner

*Primary Examiner* — Charlotte M Baker
(74) *Attorney, Agent, or Firm* — Fernando & Partners, LLP

(57) ABSTRACT

In one implementation, a method of detecting an occlusion of an image sensor is performed at a device including one or more image sensors, one or more speakers, one or more processors, and non-transitory memory. The method includes receiving, from the one or more image sensors, an image of a physical environment. The method includes detecting, based on the image of the physical environment, an occlusion at least partially occluding the one or more image sensors. The method includes classifying the occlusion as one of a plurality of occlusion types. The method includes playing, via the one or more speakers, an occlusion notification based on the classification.

20 Claims, 10 Drawing Sheets

<u>500</u>

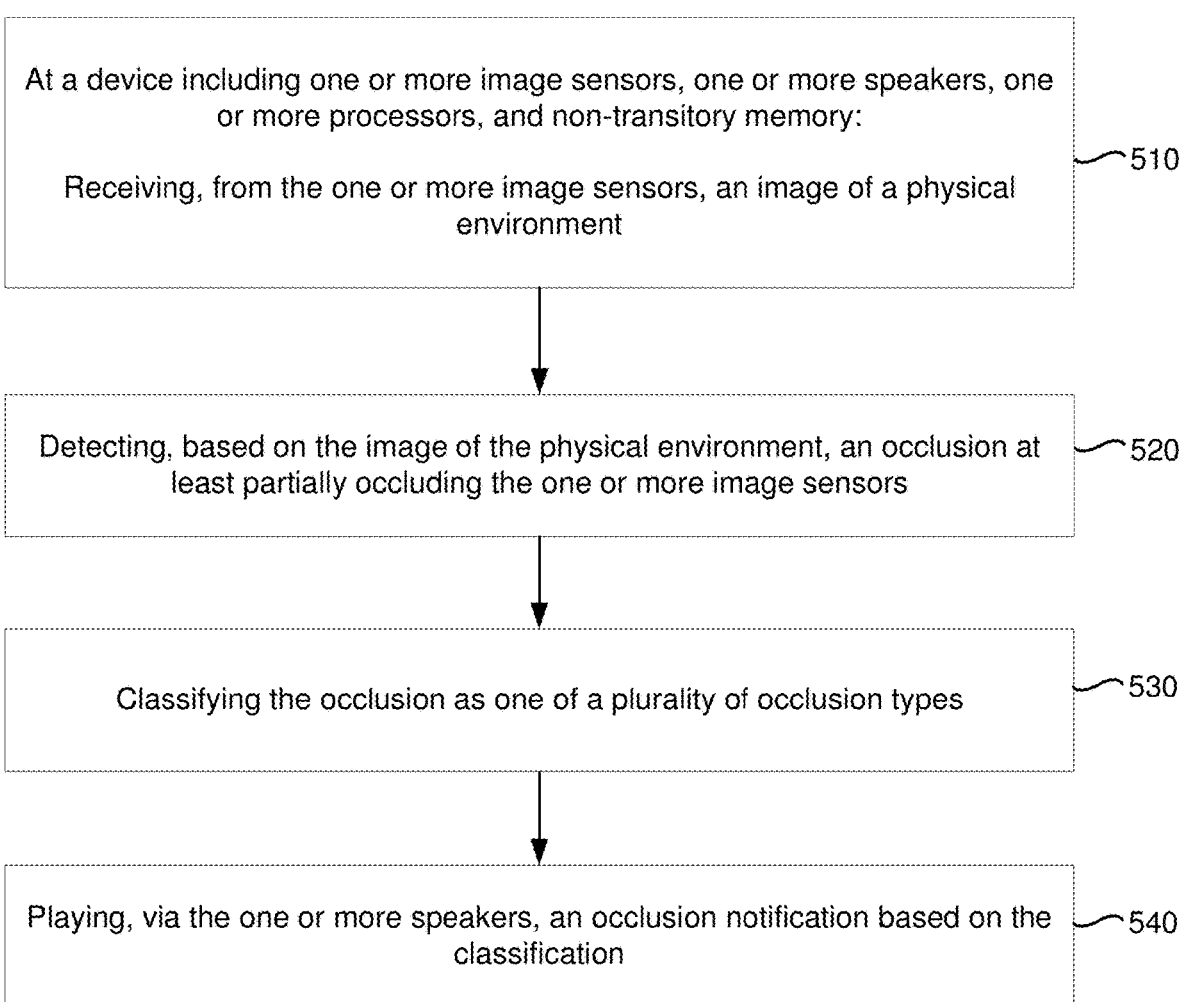

At a device including one or more image sensors, one or more speakers, one or more processors, and non-transitory memory:

Receiving, from the one or more image sensors, an image of a physical environment

~510

Detecting, based on the image of the physical environment, an occlusion at least partially occluding the one or more image sensors

~520

Classifying the occlusion as one of a plurality of occlusion types

~530

Playing, via the one or more speakers, an occlusion notification based on the classification

OCCLUSION CLASSIFICATION AND FEEDBACK

CROSS-REFERENCE TO RELATED APPLICATIONS

This application claims priority to U.S. Provisional Patent No. 63/354,023, filed on Jun. 21, 2022, which is hereby incorporated by reference in its entirety.

TECHNICAL FIELD

The present disclosure generally relates to providing feedback that an image sensor is at least partially occluded.

BACKGROUND

In various implementations, an electronic device captures, using an image sensor, images of a physical environment and processes the images to provide various user experiences, such as providing feedback regarding detected objects in the images. However, in various implementations, the image sensor may be occluded, such as by dirt or condensation, reducing the effectiveness of the user experiences.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a flowchart representation of a method of detecting an occlusion of an image sensor in accordance with some implementations.

Figure 1:
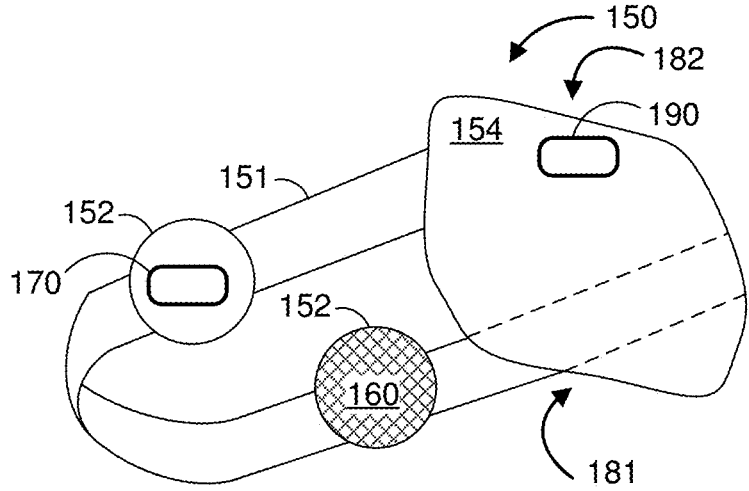
FIG. 1 is a perspective view of a head-mounted device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for detecting an occlusion of an image sensor. In various implementations, the method is performed by a device including one or more image sensors, one or more speakers, one or more processors, and non-transitory memory. The method includes receiving, from the one or more image sensors, an image of a physical environment. The method includes detecting, based on the image of the physical environment, an occlusion at least partially occluding the one or more image sensors. The method includes classifying the occlusion as one of a plurality of occlusion types. The method includes playing, via the one or more speakers, an occlusion notification based on the classification.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

In various implementations, an electronic device captures, using an image sensor, images of a physical environment and processes the images to provide various user experiences. In various implementations, the effectiveness of the user experiences can be reduced by occlusion of the image sensor.

In various implementations, the electronic device includes a display which provides pass-through video in which the captured images are displayed to a user, possibly with alteration such as the addition of virtual objects. Accordingly, by viewing the images, a user can quickly determine that the image sensor is occluded. However, in various implementations, the electronic device does not include a display. Accordingly, the electronic device determines that the image sensor is at least partially occluded and provides audio (or other non-visual) feedback to a user that the image sensor is at least partially occluded.

Further, in various implementations, the feedback provides information regarding the occlusion. For example, in various implementations, the feedback indicates a type of occlusion. For example, in various implementations, the feedback indicates that the occlusion is either a partial occlusion or a total occlusion. As another example, in various implementations, the feedback indicates that the occlusion is either occluding hair, occluding water, or occluding dirt.

FIG. 1 illustrates a perspective view of a head-mounted device 150 in accordance with some implementations. The head-mounted device 150 includes a frame 151 including two earpieces 152 each configured to abut a respective outer ear of a user. The frame 151 further includes a front component 154 configured to reside in front of a field-of-view of the user. Each earpiece 152 includes an inward-facing speaker 160 (e.g., inward-facing, outward-facing, downward-facing, or the like) and an outward-facing imaging system 170. Further, the front component 154 includes a display 181 to display images to the user, an eye tracker 182 (which may include one or more rearward-facing image sensors configured to capture images of at least one eye of the user) to determine a gaze direction or point-of-regard of the user, and a scene tracker 190 (which may include one or more forward-facing image sensors configured to capture images of the physical environment) which may supplement the imaging systems 170 of the earpieces 152.

In various implementations, the head-mounted device 150 lacks the front component 154. Thus, in various implementations, the head-mounted device is embodied as a headphone device including a frame 151 with two earpieces 152 each configured to surround a respective outer ear of a user and a headband coupling the earpieces 152 and configured to rest on the top of the head of the user. In various implementations, each earpiece 152 includes an inward-facing speaker 160 and an outward-facing imaging system 170.

In various implementations, the headphone device lacks a headband. Thus, in various implementations, the head-mounted device 150 (or the earpieces 152 thereof) is embodied as one or more earbuds or earphones. For example, an earbud includes a frame configured for insertion into an outer ear. In particular, in various implementations, the frame is configured for insertion into the outer ear of a human, a person, and/or a user of the earbud. The earbud includes, coupled to the frame, a speaker 160 configured to output sound, and an imaging system 170 configured to capture one or more images of a physical environment in which the earbud is present. In various implementations, the imaging system 170 includes one or more cameras (or image sensors). The earbud further includes, coupled to the frame, one or more processors. The speaker 160 is configured to output sound based on audio data received from the one or more processors and the imaging system 170 is configured to provide image data to the one or more processors. In various implementations, the audio data provided to the speaker 160 is based on the image data obtained from the imaging system 170.

As noted above, in various implementations an earbud includes a frame configured for insertion into an outer ear. In particular, in various implementations, the frame is sized and/or shaped for insertion into the outer ear. The frame includes a surface that rests in the intertragic notch, preventing the earbud from falling downward vertically. Further, the frame includes a surface that abuts the tragus and the anti-tragus, holding the earbud in place horizontally. As inserted, the speaker 160 of the earbud is pointed toward the ear canal and the imaging system 170 of the earbud is pointed outward and exposed to the physical environment.

Whereas the head-mounted device 150 is an example device that may perform one or more of the methods described herein, it should be appreciated that other wearable devices having one or more speakers and one or more cameras can also be used to perform the methods. The wearable audio devices may be embodied in other wired or wireless form factors, such as head-mounted devices, in-ear devices, circumaural devices, supra-aural devices, open-back devices, closed-back devices, bone conduction devices, or other audio devices.

Figure 2:
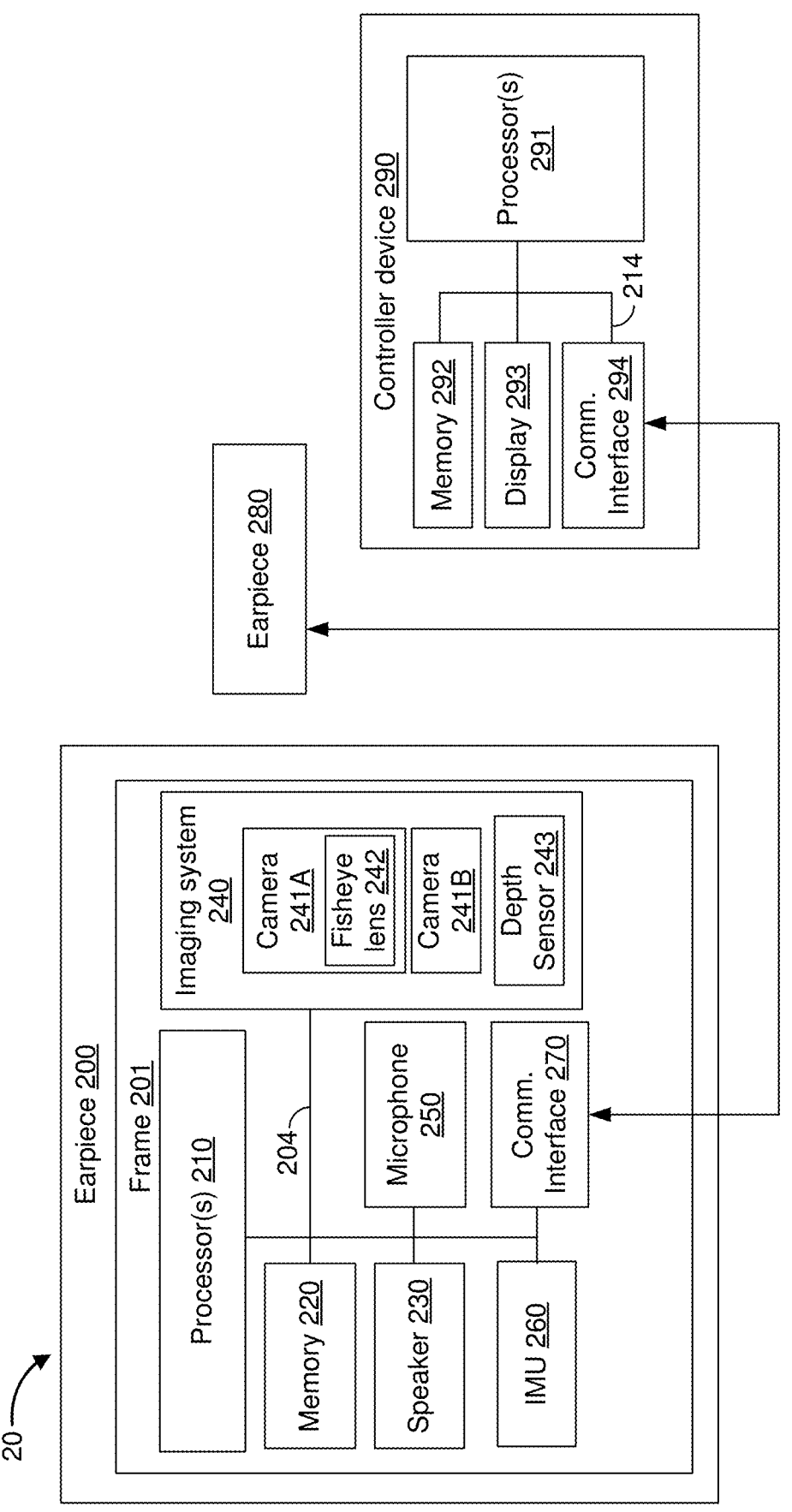
FIG. 2 is a block diagram of an example operating environment in accordance with some implementations.

FIG. 2 is a block diagram of an operating environment 20 in accordance with some implementations. The operating environment 20 includes an earpiece 200. In various implementations, the earpiece 200 corresponds to the earpiece 152 of FIG. 1. The earpiece 200 includes a frame 201. In various implementations, the frame 201 is configured for insertion into an outer ear. The earpiece 200 includes, coupled to the frame 201 and, in various implementations, within the frame 201, one or more processors 210. The earpiece 200 includes, coupled to the frame 201 and, in various implementations, within the frame 201, memory 220 (e.g., non-transitory memory) coupled to the one or more processors 210.

The earpiece 200 includes a speaker 230 coupled to the frame 201 and configured to output sound based on audio data received from the one or more processors 210. The earpiece 200 includes an imaging system 240 coupled to the frame 201 and configured to capture images of a physical environment in which the earpiece 200 is present and provide image data representative of the images to the one or more processors 210. In various implementations, the imaging system 240 includes one or more cameras 241A, 241B. In various implementations, different cameras 241A, 241B have a different field-of-view. For example, in various implementations, the imaging system 240 includes a forward-facing camera and a rearward-facing camera. In various implementations, at least one of the cameras 241A includes a fisheye lens 242, e.g., to increase a size of the field-of-view of the camera 241A. In various implementations, the imaging system 240 includes a depth sensor 243. Thus, in various implementations, the image data includes, for each of a plurality of pixels representing a location in the physical environment, a color (or grayscale) value of the location representative of the amount and/or wavelength of light detected at the location and a depth value representative of a distance from the earpiece 200 to the location.

In various implementations, the earpiece 200 includes a microphone 250 coupled to the frame 201 and configured to generate ambient sound data indicative of sound in the physical environment. In various implementations, the earpiece 200 includes an inertial measurement unit (IMU) 260 coupled to the frame 201 and configured to determine movement and/or the orientation of the earpiece 200. In various implementations, the IMU 260 includes one or more accelerometers and/or one or more gyroscopes. In various implementations, the earpiece 200 includes a communications interface 270 coupled to frame configured to transmit and receive data from other devices. In various implementations, the communications interface 270 is a wireless communications interface.

The earpiece 200 includes, within the frame 201, one or more communication buses 204 for interconnecting the various components described above and/or additional components of the earpiece 200 which may be included.

In various implementations, the operating environment 20 includes a second earpiece 280 which may include any or all of the components of the earpiece 200. In various implementations, the frame 201 of the earpiece 200 is configured for insertion in one outer ear of a user and the frame of the second earpiece 280 is configured for insertion in another outer ear of the user, e.g., by being a mirror version of the frame 201.

In various implementations, the operating environment 20 includes a controller device 290. In various implementations, the controller device 290 is a smartphone, tablet, laptop, desktop, set-top box, smart television, digital media player, or smart watch. The controller device 290 includes one or more processors 291 coupled to memory 292, a display 293, and a communications interface 294 via one or more communication buses 214. In various implementations, the controller device 290 includes additional components such as any or all of the components described above with respect to the earpiece 200.

In various implementations, the display 293 is configured to display images based on display data provided by the one or more processors 291. In contrast, in various implementations, the earpiece 200 (and, similarly, the second earpiece 280) does not include a display or, at least, does not include a display within a field-of-view of the user when inserted into the outer ear of the user.

In various implementations, the one or more processors 210 of the earpiece 200 generates the audio data provided to the speaker 230 based on the image data received from the imaging system 240. In various implementations, the one or more processors 210 of the earpiece transmits the image data via the communications interface 270 to the controller device 290, the one or more processors of the controller device 290 generates the audio data based on the image data, and the earpiece 200 receives the audio data via the communications interface 270. In either set of implementations, the audio data is based on the image data.

Figure 3:
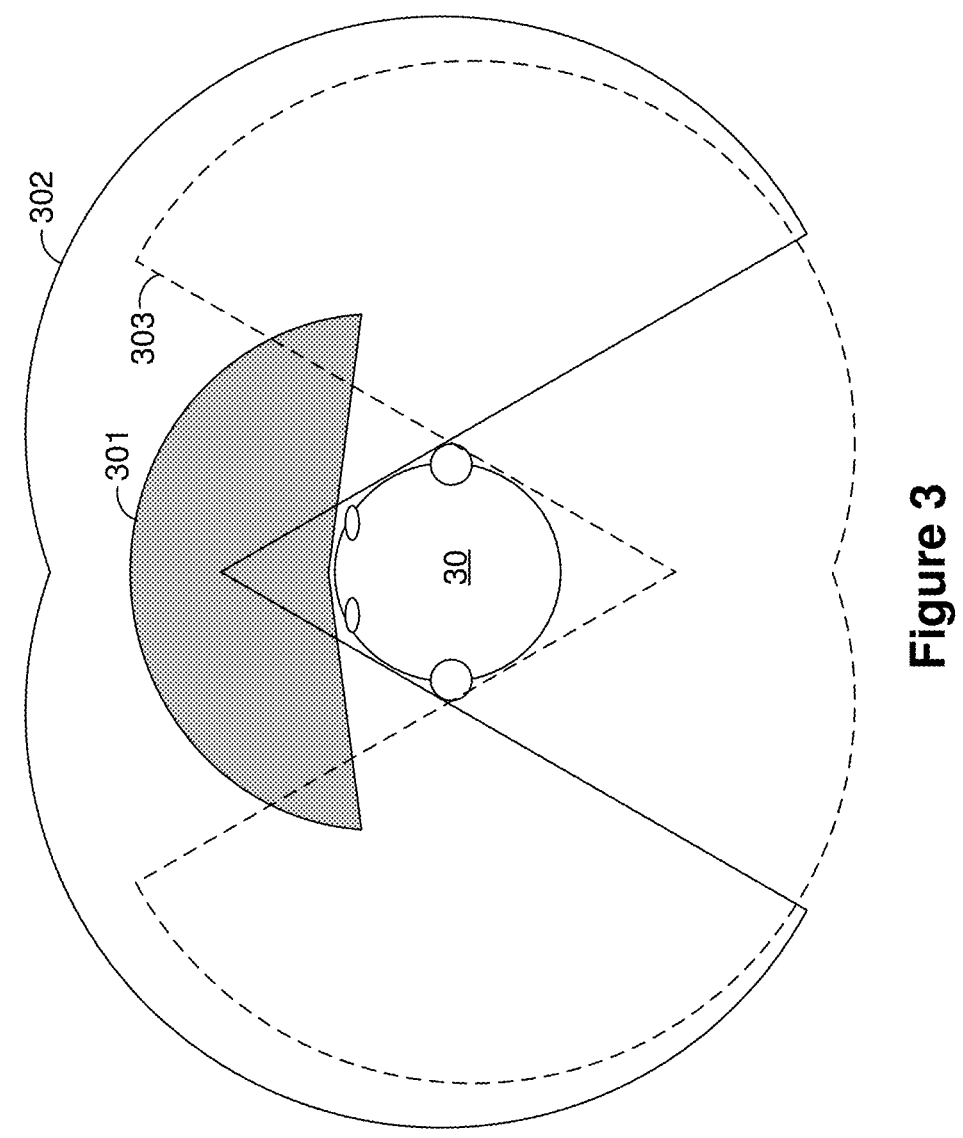
FIG. 3 illustrates various field-of-views in accordance with some implementations.

FIG. 3 illustrates various field-of-views in accordance with some implementations. A user field-of-view 301 of a user 30 typically extends approximately 300 degrees with varying degrees of visual perception within that range. For example, excluding far peripheral vision, the user field-of-view 301 is only approximately 120 degrees, and the user field-of-view 301 including only foveal vision (or central vision) is only approximately 5 degrees.

In contrast, a system (head-mounted device 150 of FIG. 1) may have a device field-of-view that includes views outside the user field-of-view 301 of the user 30. For example, a system may include a forward-and-outward-facing camera including a fisheye lens with a field-of-view of 180 degrees proximate to each ear of the user 30 and may have a device forward field-of-view 302 of approximately 300 degrees. Further, a system may further include a rearward-and-outward-facing camera including a fisheye lens with a field-of-view of 180 degrees proximate to each ear of the user 30 and may also have a device rearward field-of-view 303 of approximately 300 degrees. In various implementations, a system including multiple cameras proximate to each ear of the user can have a device field-of-view of a full 360 degrees (e.g., including the device forward field-of-view 302 and the device rearward field-of-view 303). It is to be appreciated that, in various implementations, the cameras (or combination of cameras) may have smaller or larger fields-of-view than the examples above.

The systems described above can perform a wide variety of functions. For example, in various implementations, while playing audio (e.g., music or an audiobook) via the speaker, in response to detecting a particular hand gesture (even a hand gesture performed outside a user field-of-view) in images captured by the imaging system, the system may alter playback of the audio (e.g., by pausing or changing the volume of the audio). For example, in various implementations, in response to detecting a hand gesture performed by a user proximate to the user's ear of closing an open hand into a clenched first, the system pauses the playback of audio via the speaker.

As another example, in various implementations, while playing audio via the speaker, in response to detecting a person attempting to engage the user in conversation or otherwise talk to the user (even if the person is outside the user field-of-view) in images captured by the imaging system, the system may alter playback of the audio. For example, in various implementations, in response to detecting a person behind the user attempting to talk to the user, the system reduces the volume of the audio being played via the speaker and ceases performing an active noise cancellation algorithm.

As another example, in various implementations, in response to detecting an object or event of interest in the physical environment in images captured by the imaging system, the system generates an audio notification. For example, in various implementations, in response to detecting a person in the user's periphery or outside the user field-of-view attempting to get the user's attention (e.g., by waving the person's arms), the device plays, via the speaker, an alert notification (e.g., a sound approximating a person saying "Hey!"). In various implementations, the system plays, via two or more speakers, the alert notification spatially such that the user perceives the alert notification as coming from the direction of the detected object.

As another example, in various implementations, in response to detecting an object or event of interest in the physical environment in images captured by the imaging system, the system stores, in the memory, an indication that the particular object was detected (which may be determined using images from the imaging system) in association with a location at which the object was detected (which may also be determined using images from the imaging system) and a time at which the object was detected. In response to a user query (e.g., a vocal query detected via the microphone), the system provides an audio response. For example, in response to detecting a water bottle in an office of the user, the system stores an indication that the water bottle was detected in the office and, in response to a user query at a later time of "Where is my water bottle?", the device may generate audio approximating a person saying "In your office."

As another example, in various implementations, in response to detecting an object in the physical environment approaching the user in images captured by the imaging system, the system generates an audio notification. For example, in various implementations, in response to detecting a car approaching the user at a speed exceeding a threshold, the system plays, via the speaker, an alert notification (e.g., a sound approximating the beep of a car horn). In various implementations, the system plays, via two or more speakers, the alert notification spatially such that the user perceives the alert notification as coming from the direction of the detected object.

As another example, in various implementations, in response to detecting a hand gesture indicating an actionable item, the system performs an action associated with the actionable item. For example, in various implementations, in response to detecting a user swiping across a phone number, the system calls the phone number.

FIGS. 4A-4F illustrate a device field-of-view 400 of an outdoor physical environment during a series of time periods in various implementations. In various implementations, each time period is an instant, a fraction of a second, a few seconds, a few hours, a few days, or any length of time.

The device field-of-view 400 includes a user field-of-view 401 and both a left portion 402A outside of the user field-of-view 401 and a right portion 402B outside of the user field-of-view 401. In various implementations, the device field-of-view 400 does not include all of the user field-of-view 401. For example, in various implementations, the device field-of-view 400 includes a first portion of the user field-of-view 401 and does not include a second portion of the user field-of-view 401. In various implementations, the device field-of-view 400 does not include any of the user field-of-view 401. The device field-of-view 400 includes a trail 411 upon which the user is walking in the user field-of-view 401.

Figure 4A:
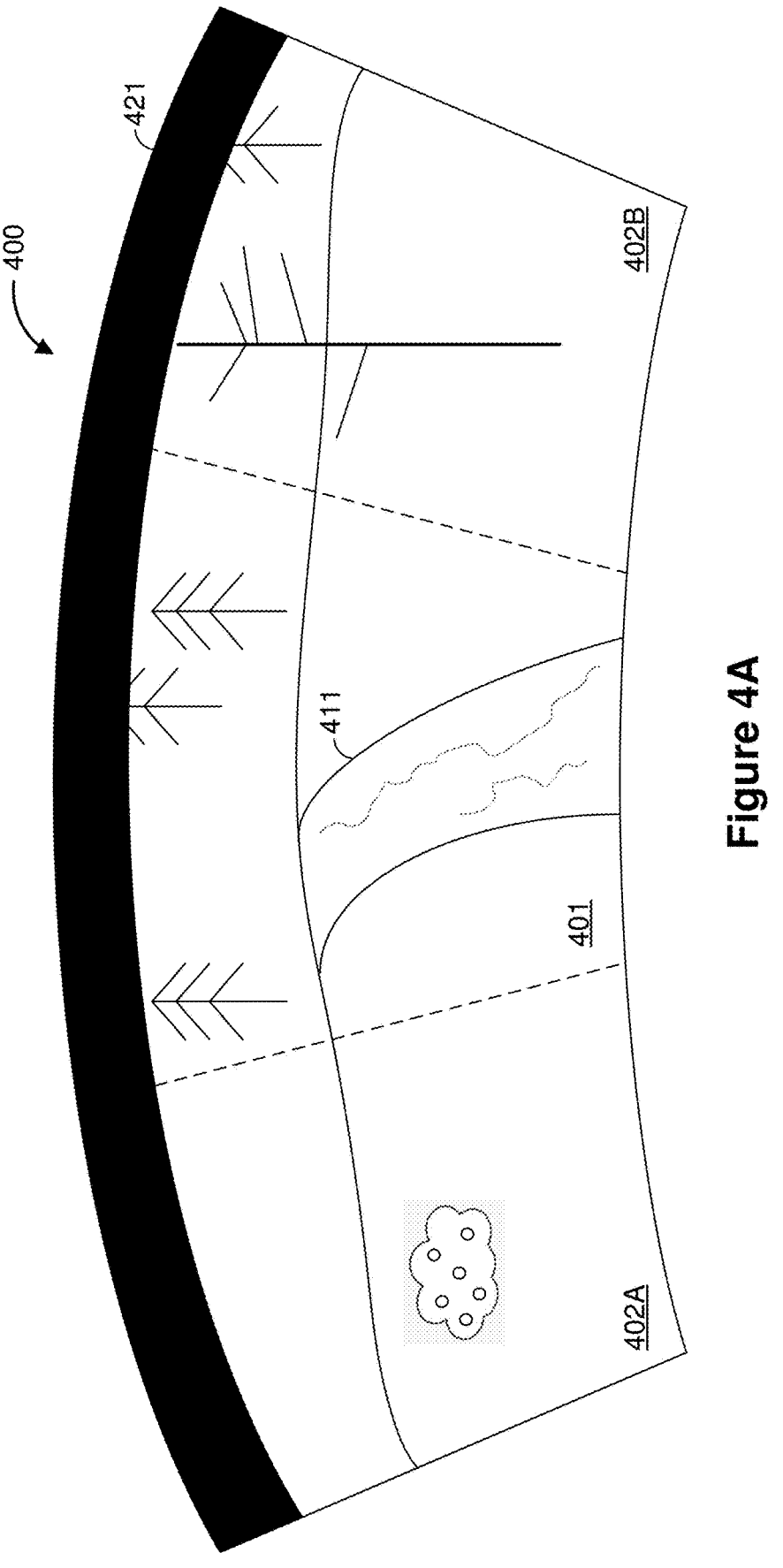
FIGS. 4A-4F illustrate a device field-of-view of a physical environment during various time periods in accordance with some implementations.

FIG. 4A illustrates the device field-of-view 400 during a first time period. During the first time period, a hat 421 worn by the user occludes the upper portion of the device field-of-view 400. The device detects the occlusion of the device field-of-view 400 and classifies the occlusion. In various implementations, the device classifies the occlusion as one of plurality of levels of occlusion. In various implementations, the levels of occlusion include a first level below a notification threshold, a second level above the notification threshold and below a processing threshold, and a third level above the processing threshold. When the level of occlusion is below the notification threshold (e.g., the first level), the device does not automatically provide feedback regarding the occlusion to the user. When the level of occlusion is above the notification threshold (e.g., the second level or the third level), the device provides feedback regarding the occlusion to the user, e.g., by audibly playing an occlusion notification. When the level of occlusion is below the processing threshold (e.g., the first level and the second level), the device continues to process images of the physical environment to provide various user experiences. When the level of occlusion is above the processing threshold (e.g., the third level), the device ceases to process images of the physical environment until the occlusion is cleared (at least to a level below the processing threshold).

In various implementations, the device classifies the occlusion based on the transmissivity of the occlusion. For example, in various implementations, the device classifies the occlusion as an opaque occlusion, in which at least a portion of the device field-of-view 400 is blocked by an opaque object (such as clothing, hair, or dirt) or a transparent occlusion, in which at least a portion of the device field-of-view 400 is distorted by a transparent object (such as fog, condensation, or water drops).

In various implementations, the device classifies the occlusion based on the object causing the occlusion. For example, in various implementations, the device classifies the occlusion as a clothing occlusion, hair occlusion, dirt occlusion, or water occlusion. In various implementations, the device classifies the occlusion based on one or more heuristics. For example, a transparent occlusion is more likely to be classified as a water occlusion. As another example, an occlusion blocking a contiguous portion of the device field-of-view 400 is more likely to be classified as a clothing occlusion. As another example, an occlusion that moves between images of the physical environment is more likely to be classified as a hair occlusion. In various implementations, the device classifies the occlusion based on the object using a neural network.

In FIG. 4A, the device classifies the occlusion as a clothing occlusion with a level of occlusion below the notification threshold. Accordingly, the device does not automatically provide an occlusion notification to the user. However, in various implementations, in response to a user query (e.g., a verbal query asking "How's the view?"), the device plays an verbal response based on the classification of the occlusion (e.g., "Your hat is partially blocking the view.")

Figure 4B:
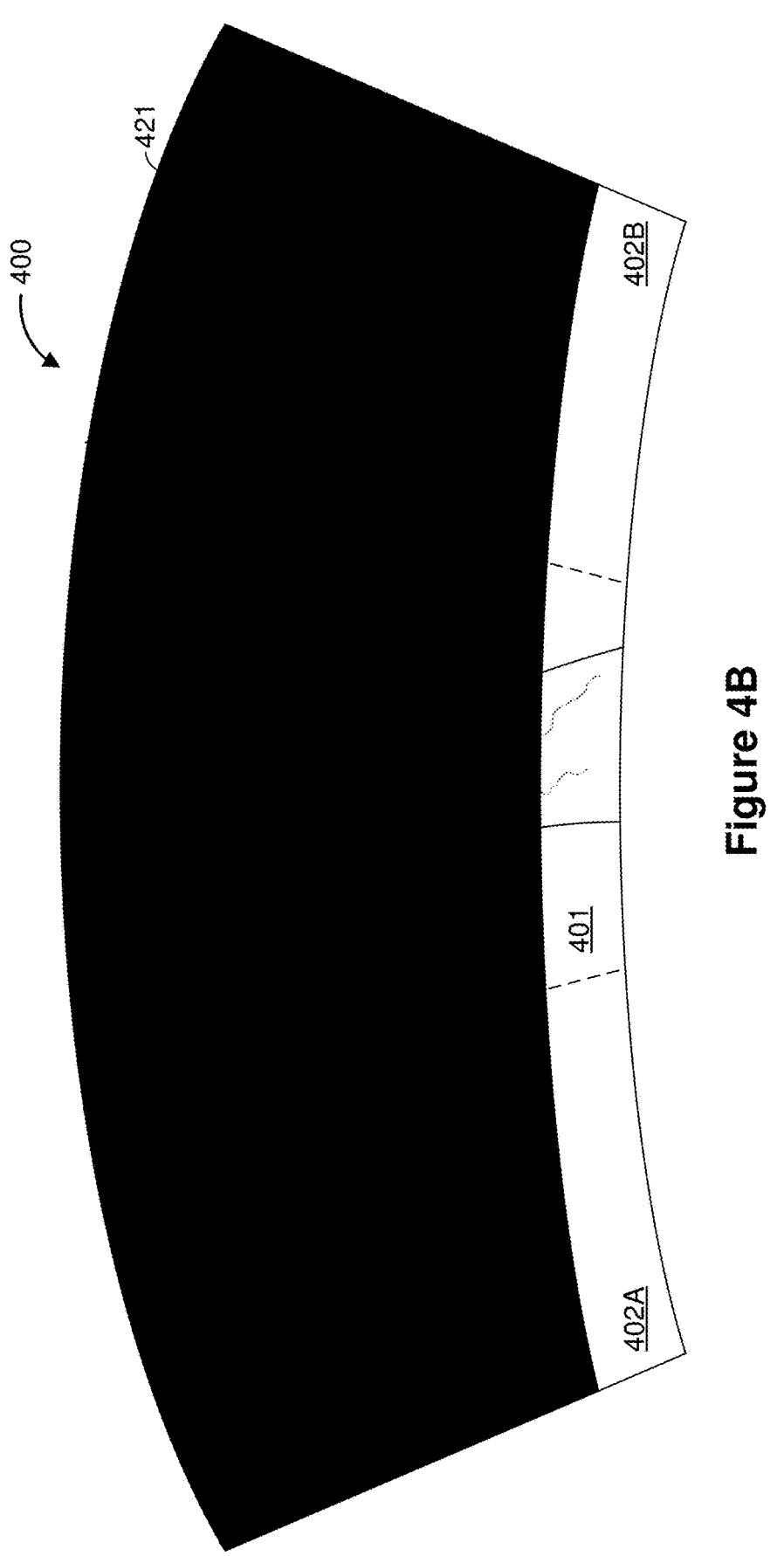

FIG. 4B illustrates the device field-of-view 400 during a second time period subsequent to the first time period. During the second time period, the user has pulled down the hat 421. Accordingly, the hat 421 occludes most of the device field-of-view 400. The device detects the occlusion and classifies the occlusion as a clothing occlusion with a level of occlusion above the notification threshold. Accordingly, in response to detecting the occlusion, the device plays an occlusion notification. In various implementations, the occlusion notification is a series of one or more tones or beeps. In various implementations, the occlusion notification is a verbal notification (e.g., "Your hat is blocking the view.") In various implementations, the verbal notification provides instructions for clearing the occlusion (e.g., "Please adjust your hat.")

Figure 4C:
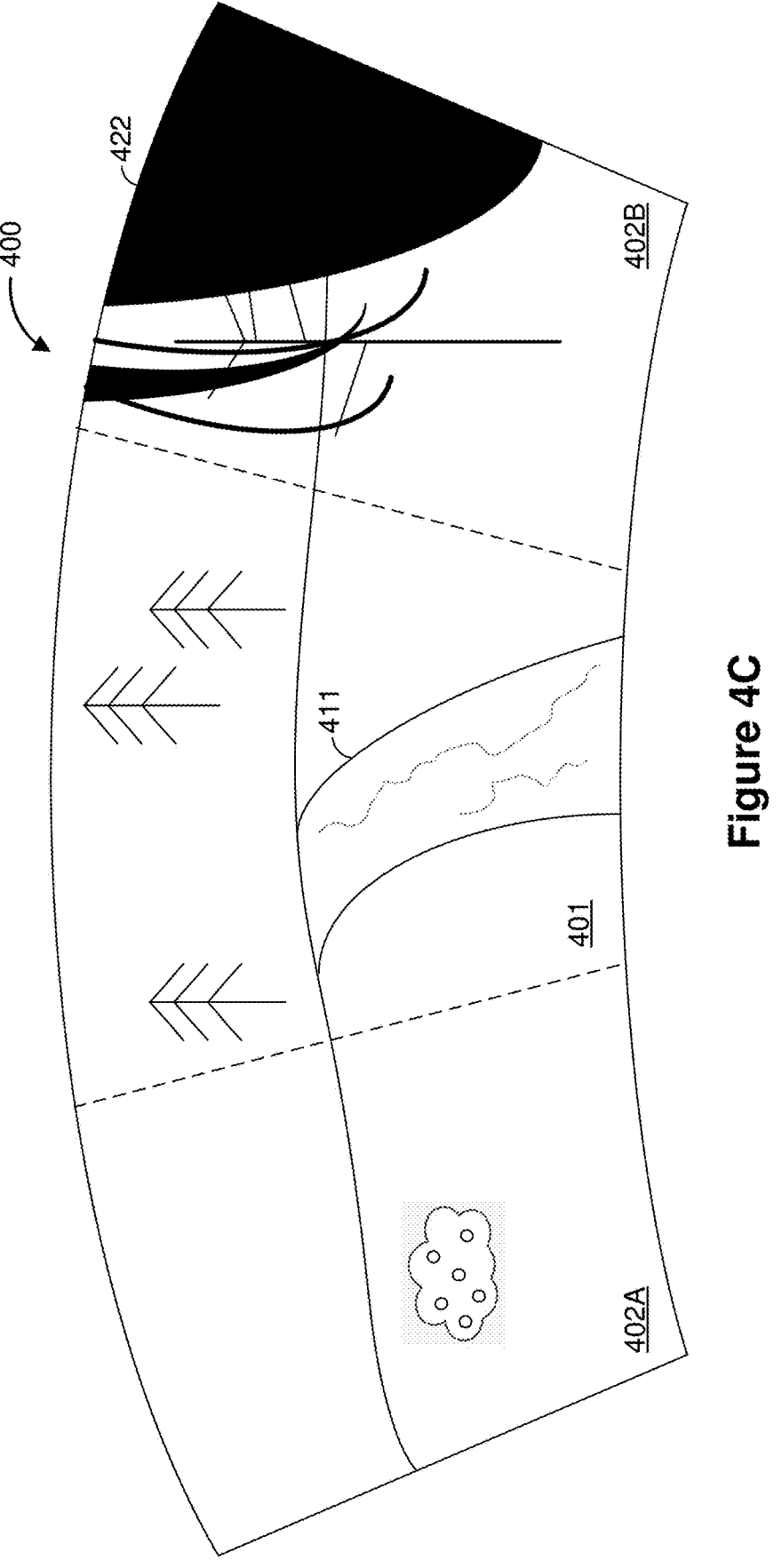

FIG. 4C illustrates the device field-of-view 400 during a third time period subsequent to the second time period. During the third time period, the user has removed the hat 421, but hair 422 of the user partially occludes the right portion 402B of the device field-of-view 400. The device detects the occlusion and classifies the occlusion as a hair occlusion with a level of occlusion above the notification threshold. Accordingly, in response to detecting the occlusion, the device plays an occlusion notification. In various implementations, the occlusion notification is a series of one or more tones or beeps. In various implementations, the occlusion notification is a verbal notification (e.g., "Your hair is blocking the view.") In various implementations, the verbal notification provides instructions for clearing the occlusion (e.g., "Please pull back your hair.")

In various implementations, in response to detecting an occlusion of the left portion 402A or the right portion 402B of the device field-of-view 400 (corresponding to a left image sensor or a right image sensor), the device plays the occlusion notification in a corresponding ear of the user (corresponding to a left speaker or a right speaker) without playing the occlusion notification in the other ear of the user. Thus, in FIG. 4C, in various implementations, in response to detecting the occlusion of the right portion 402B of the device field-of-view 400, the device plays a verbal notification (e.g., "Hair detected.") with a right speaker in a right ear of the user without playing a verbal notification with a left speaker in a left ear of the user.

Figure 4D:
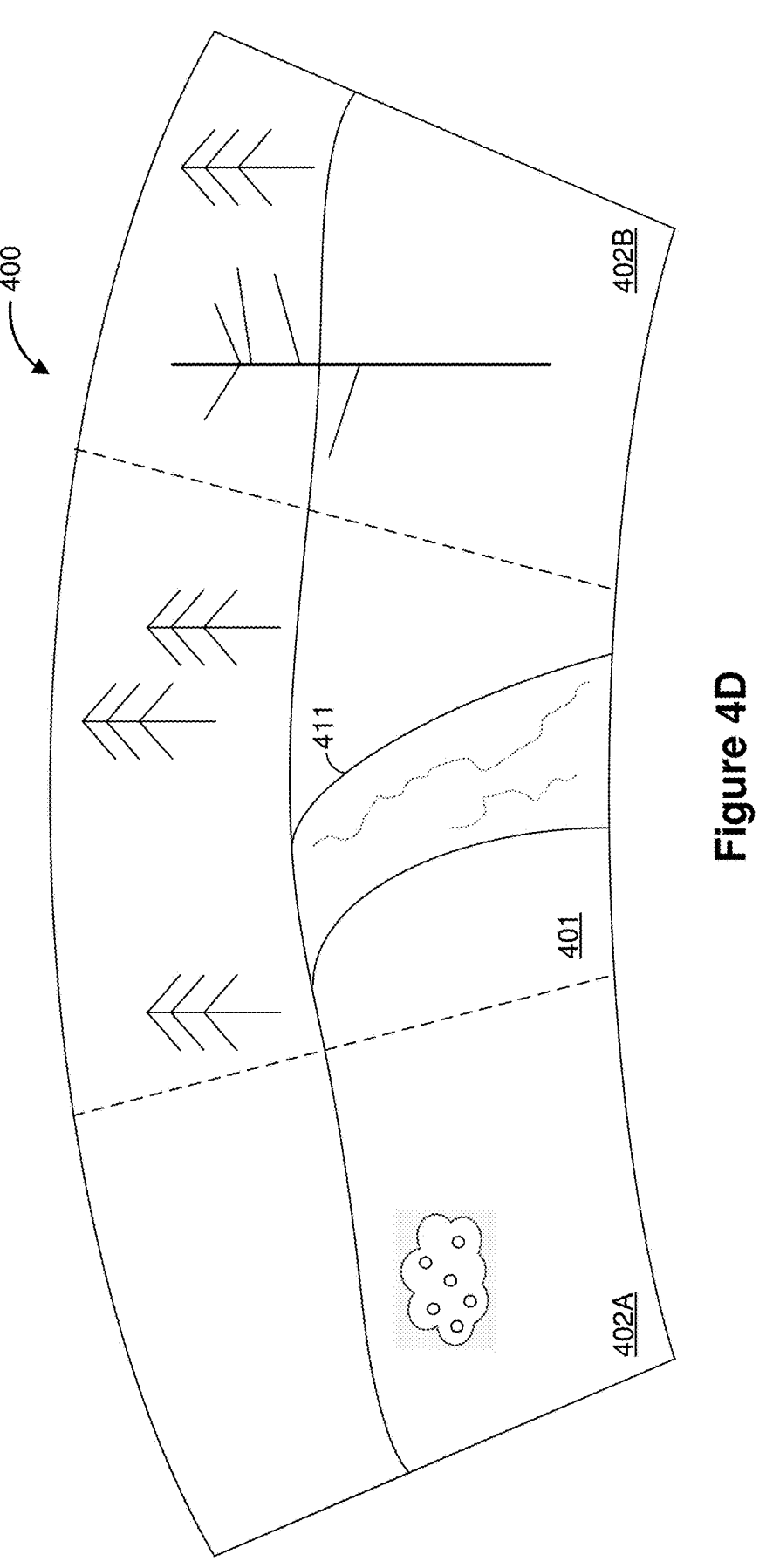

FIG. 4D illustrates the device field-of-view 400 during a fourth time period subsequent to the third time period. During the fourth time period, the user has tucked the hair 422 of the user behind the ear of the user, clearing all occlusions of the device field-of-view 400. The device detects that the device field-of-view is free of occlusion. In response to detecting an occlusion of the device field-of-view 400 and subsequently detecting no occlusion of the device field-of-view 400, the device detects clearing of the occlusion. In various implementations, in response to detecting clearing of the occlusion, the device plays a clearing notification. In various implementations, the clearing notification is a series of one or more tones or beeps. In various implementations, the occlusion notification and the clearing notification are different. However, in various implementations, the occlusion notification and the clearing notification are complementary. For example, in various implementations, the occlusion notification is a descending arpeggio and the clearing notification is an ascending arpeggio (e.g., of the same tones). In various implementations, the occlusion notification includes two tones in a minor interval and the clearing notification includes two tones in a major interval. In various implementations, the clearing notification is a verbal notification (e.g., "Occlusion cleared.")

Figure 4E:
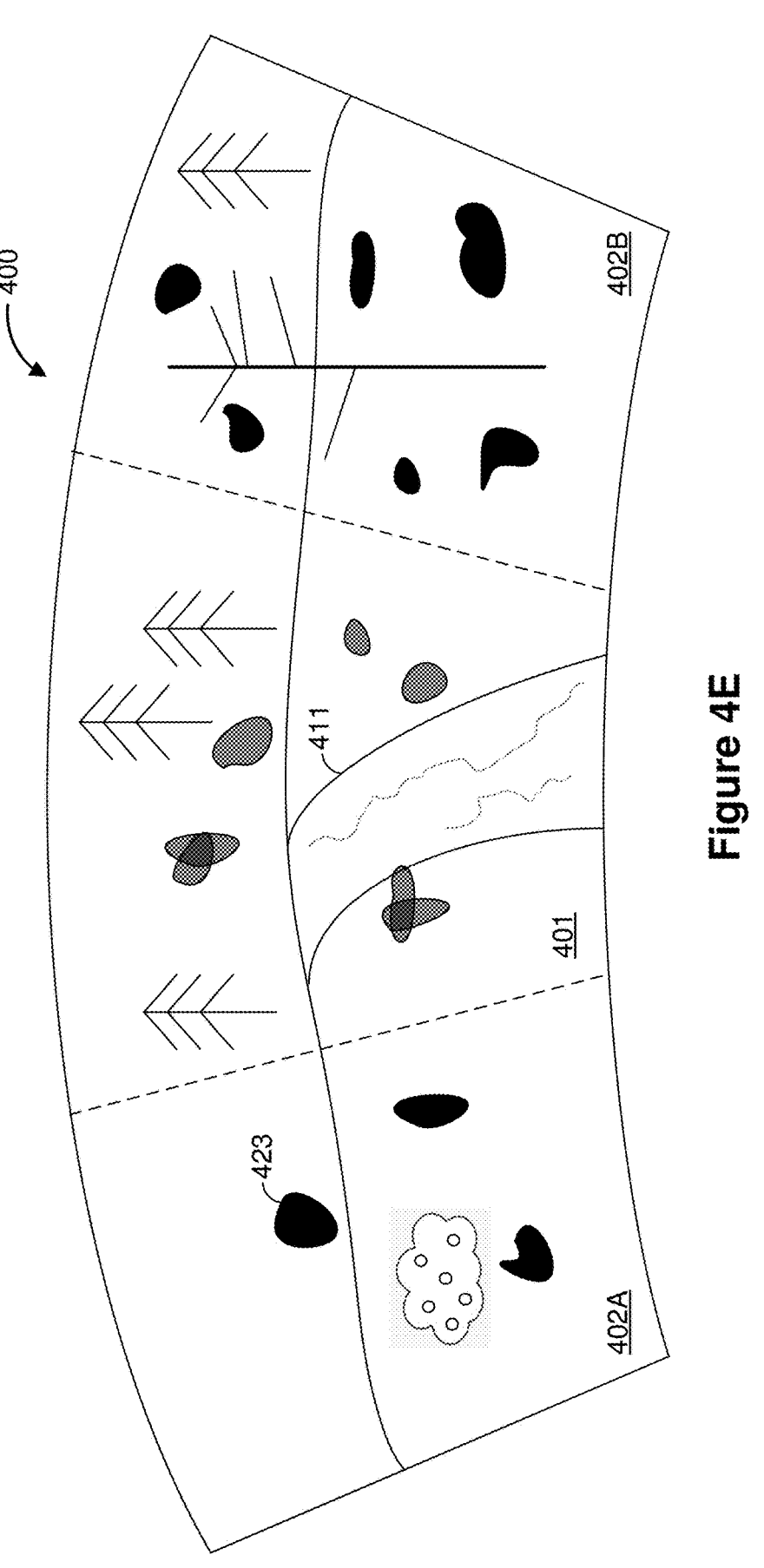

FIG. 4E illustrates the device field-of-view 400 during a fifth time period subsequent to the fourth time period. During the fifth time period, dirt 423 occludes the device field-of-view 400. The device detects the occlusion and classifies the occlusion as a dirt occlusion with a level of occlusion above the notification threshold. Accordingly, in response to detecting the occlusion, the device plays an occlusion notification. In various implementations, the occlusion notification is a series of one or more tones or beeps. In various implementations, the occlusion notification is a verbal notification (e.g., "The camera is dirty.") In various implementations, the verbal notification provides instructions for clearing the occlusion (e.g., "Please clean the camera lens.")

Figure 4F:
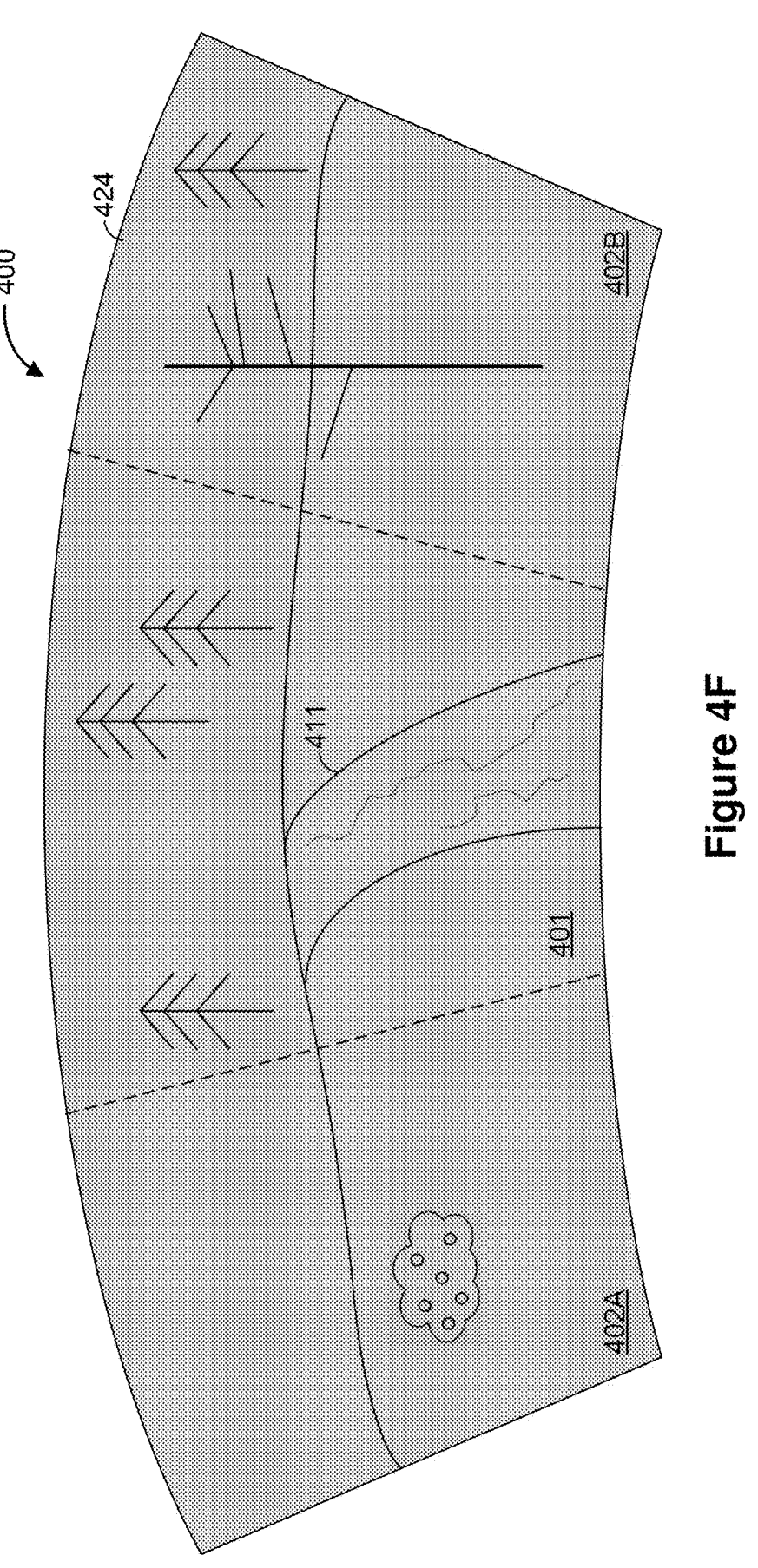

FIG. 4F illustrates the device field-of-view 400 during a sixth time period subsequent to the fifth time period. During the sixth time period, the user has cleaned the dirt 423 from the device field-of-view, but water 424 used in the cleaning occludes the device field-of-view 400. The device detects the occlusion and classifies the occlusion as a water occlusion with a level of occlusion above the notification threshold. Accordingly, in response to detecting the occlusion, the device plays an occlusion notification. In various implementations, the occlusion notification is a series of one or more tones or beeps. In various implementations, the occlusion notification is a verbal notification (e.g., "The camera is wet.") In various implementations, the verbal notification provides instructions for clearing the occlusion (e.g., "Please dry the camera lens.")

FIG. 5 is a flowchart representation of a method 500 of detecting occlusion of an image sensor in accordance with some implementations. In various implementations, the method 500 is performed by a device including one or more image sensors, one or more speakers, one or more processors, and non-transitory memory (e.g., the head-mounted device 150 of FIG. 1 or the earpiece 200 of FIG. 2). In various implementations, the method 500 is performed by a device without a display. In various implementations, the method 500 is performed by a device with a display. In various implementations, the method 500 is performed using an audio device (e.g., the head-mounted device 150 of FIG. 1 or the earpiece 200 of FIG. 2) in conjunction with a peripheral device (e.g., the controller device 290 of FIG. 2). In various implementations, the method 500 is performed by processing logic, including hardware, firmware, software, or a combination thereof. In various implementations, the method 500 is performed by a processor executing instructions (e.g., code) stored in a non-transitory computer-readable medium (e.g., a memory).

The method 500 begins, in block 510, with the device receiving, from the one or more image sensors, an image of a physical environment. For example, in FIGS. 4A-4F, the image of the physical environment has a device field-of-view 400 that includes the user field-of-view 401 and both a left portion 402A outside of the user field-of-view 401 and a right portion 402B outside of the user field-of-view 401. In various implementations, the device field-of-view includes one or more areas outside the user field-of-view and may include none or only a portion of the user field-of-view.

The method 500 continues, in block 520, with the device detecting, based on the image of the physical environment, an occlusion at least partially occluding the one or more image sensors. For example, in FIG. 4A and FIG. 4B, the device detects the hat 421 at least partially occluding the device field-of-view 400. As another example, in FIG. 4C, the device detects the hair 422 at least partially occluding the right portion 402B of the device field-of-view 400. As another example, in FIG. 4E, the device detects the dirt 423 at least partially occluding the device field-of-view 400. As another example, in FIG. 4F, the device detects the water 424 at least partially occluding the device field-of-view 400.

In various implementations, the device transmits the image of the physical environment to a peripheral device which detects the occlusion in the image of the physical environment (and, in various implementations, classifies the occlusion). In response to the detection, the peripheral device transmits an indication of the detection (and, in various implementations, the classification) to the device. Accordingly, in various implementations, detecting the occlusion (and, in various implementations, classifying the occlusion) includes transmitting, to a peripheral device, the image of the physical environment to a peripheral device and receiving, from the peripheral device, an indication of the detection (and, in various implementations, the classification).

For example, in various implementations, the indication is an audio signal to be played by the device. As another example, in various implementations, the indication includes parameters indicative of the detection (and, in various implementations, the classification). In response to receiving the parameters indicative of the detection (and, in various implementations, the classification), the device generates the audio signal to be played by the device.

In various implementations, the image of a physical environment has a device field-of-view different than a user field-of-view and wherein the occlusion is detected outside an area of the user field-of-view. For example, in FIG. 4C, the device detects the occlusion caused by the hair 422 in the right portion 402B of the device field-of-view 400 outside of the user field-of-view 401.

In various implementations, the device determines that the occlusion is detected completely outside the user field-of-view. Thus, in various implementations, determining that the occlusion is detected outside the area of the user field-of-view includes determining that the occlusion is detected outside the user field-of-view. As another example, in various implementations, the device determines that the occlusion is detected is within the user field-of-view, but outside a portion of the user field-of-view such as a foveal portion of the user field-of-view or a peripheral portion of the user field-of-view. Thus, in various implementations, determining that the occlusion is detected outside the area of the user field-of-view includes determining that the occlusion is detected outside a portion of the user field-of-view.

In various implementations, to determine that the occlusion is detected outside the area of the user field-of-view, the device estimates the area of the user field-of-view and determines that the occlusion is detected outside the estimated area, e.g., not within the estimated area. Thus, in various implementations, determining that the occlusion is detected outside the area of the user field-of-view includes estimating the area of the user field-of-view.

In various implementations, the device includes an eye tracker. For example, the head-mounted device 150 of FIG. 1 includes the eye tracker 182. In various implementations, based on the information from the eye tracker, the device estimates the area of the user field-of-view as an area surrounding the location at which the user is looking. For example, a foveal portion of the user field-of-view may an area be approximately 5 degrees (or some other value) surrounding the location at which the user is looking. As another example, a near-peripheral portion of the user field-of-view may be approximately 30 degrees (or some other value) surrounding the location at which the user is looking. Thus, in various implementations, estimating the area of the user field-of-view includes determining an area around a gaze location of the user.

In various implementations, the device includes multiple image sensors. For example, the head-mounted 150 of FIG. 1 includes two outward-facing imaging systems 170. As another example, the earpiece 200 in conjunction with the earpiece 280 of FIG. 2 includes two imaging systems 240. In various implementations, the image of the physical environment is generated by combining two images of the physical environment from two image sensors, each of the two images having two different field-of-views. In various implementations, the device estimates the area of the user field-of-view as an area surrounding a location (e.g., the center) in an area where the different field-of-views overlap. For example, a near-peripheral portion of the user field-of-view may be approximately 30 degrees (or some other value) surrounding the center of the area where the different field-of-views overlap. Thus, in various implementations, estimating the area of the user field-of-view includes determining an area around a location in an overlap region of the image of the physical environment.

In various implementations, the device determines the area of the user field-of-view based on user feedback. For example, during a calibration procedure, a user may define the area of the user field-of-view by placing a finger at the edge of the area of the user field-of-view. In response to detecting the finger of the user, the device determines the area of the user field-of-view as being to the left or right of the finger. As another example, a user may define the user field-of-view by placing a finger at the edge of the user field-of-view. In response to detecting the finger of the user, the device determines a mid-peripheral portion of user field-of-view as being half (or some other fraction) of the image of the physical environment to the left or right of the finger. Thus, in various implementations, estimating the area of the user field-of-view includes receiving user feedback regarding the user field-of-view.

The method 500 continues, in block 530, with the device classifying the occlusion at one of a plurality of occlusion types. In various implementations, the plurality of occlusion types includes a plurality of object type occlusion types. Each of the plurality of object type occlusion types is associated with an object type of an object causing the occlusion. In various implementations, the plurality of object type occlusion types includes one or more of a clothing occlusion type, a hair occlusion type, a dirt occlusion type, or a water occlusion type. For example, in FIG. 4C, the device classifies the occlusion caused by the hair 422 as a hair occlusion, e.g., an occlusion having a hair occlusion type. As another example, in FIG. 4F, the device classifies the occlusion caused by the water 424 as a water occlusion, e.g., an occlusion having a water occlusion type.

In various implementations, a clothing occlusion can be caused by a hat, such as the hat 421 in FIG. 4A or FIG. 4B. In various implementations, a clothing occlusion can be caused by the collar of a shirt or jacket. In various implementations, a dirt occlusion type can be caused by mud, sand, or other debris. In various implementations, a water occlusion can be caused by water drops, condensation, or fog.

In various implementations, classifying the occlusion, e.g., classifying the occlusion as one of a plurality of object type occlusion types, includes applying a neural network to the image of the physical environment. In various implementations, the neural network includes an interconnected group of nodes. In various implementation, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the neural network is trained on training data to set the weights.

In various implementations, the neural network includes a deep learning neural network. Accordingly, in some implementations, the neural network includes a plurality of layers (of nodes) between an input layer (of nodes) and an output layer (of nodes). In various implementations, the neural network receives, as inputs, images of the physical environment. In various implementations, the neural network provides, as an output, an object type occlusion type.

In various implementations, the plurality of occlusion types includes an opaque occlusion type and a transparent occlusion type. Thus, in various implementations, classifying the occlusion as one of a plurality of object types includes classifying the occlusion as one of an opaque occlusion type or a transparent occlusion type. For example, in FIG. 4B, the device classifies the occlusion caused by the hat 421 as an opaque occlusion, e.g., an occlusion having an opaque occlusion type. As another example, in FIG. 4F, the device classifies the occlusion caused by the water 424 as a transparent occlusion, e.g., an occlusion having a transparent occlusion type.

In various implementations, the plurality of occlusion types includes a first occlusion type associated with a level of occlusion below a threshold and a second occlusion type associated with a level of occlusion above the threshold. For example, in FIG. 4A, the device classifies the occlusion caused by the hat 421 as a first occlusion type associated with a level of occlusion below a notification threshold. As another example, in FIG. 4B, the device classifies the occlusion caused by the hat 421 as a second occlusion type associated with a level of occlusion above the notification threshold.

In various implementations, the one or more image sensors includes a left image sensor and a right image sensor and the plurality of occlusion types includes a left image sensor occlusion type associated with occlusion of the left image sensor and a right image sensor occlusion type associated with occlusion of the right image sensor. For example, in FIG. 4C, the device classifies the occlusion caused by the hair 422 as a right image sensor occlusion, e.g., an occlusion having the right image sensor occlusion type.

The method 500 continues, in block 540, with the device playing, via the one or more speakers, an occlusion notification based on the classification. In various implementations, as noted above, the plurality of occlusion types includes a first occlusion type associated with level of occlusion below a threshold and a second occlusion type associated with level of occlusion above the threshold. In various implementations, playing the occlusion notification based on the classification includes playing the occlusion notification in response to classifying the occlusion as the second occlusion type. For example, in FIG. 4A, in response to classifying the occlusion caused by the hat 421 as the first occlusion type, the device does not automatically play an occlusion notification. However, in FIG. 4B, in response to classifying the occlusion caused by the hat 421 as the second occlusion type, the device automatically plays an occlusion notification.

In various implementations, as noted above, the plurality of occlusion types includes a left image sensor occlusion type associated with occlusion of the left image sensor and a right image sensor occlusion type associated with occlusion of the right image sensor. In various implementations, the one or more speakers includes a left speaker and a right speaker and playing the occlusion notification based on the classification includes playing the occlusion notification in one of the left speaker or the right speaker, e.g., a speaker corresponding to the occluded image sensor. For example, in FIG. 4C, in response to detecting the occlusion caused by the hair 422 in the right portion 402B of the device field-of-view 400, the device plays an occlusion notification via the right speaker in the right ear of the user.

In various implementations, the occlusion notification includes one or more tones. In various implementations, the occlusion notification is a verbal notification. For example, in FIG. 4B, in response to detecting the occlusion caused by the hat 421, the device plays a verbal notification saying, "Your hat is blocking the view." As another example, in FIG. 4C, in response to detecting the occlusion caused by the hair 422, the device plays a verbal notification saying, "Your hair is blocking the view." In various implementations, the verbal notification includes instructions for clearing the occlusion. For example, in FIG. 4B, in response to detecting the occlusion caused by the hat 421, the device plays a verbal notification saying, "Please adjust your hat." As another example, in FIG. 4C, in response to detecting the occlusion caused by the hair 422, the device plays a verbal notification saying, "Please pull back your hair."

Accordingly, different verbal notifications are played based on the classification. Thus, in various implementations, playing the occlusion notification based on the classification includes playing a verbal notification based on the classification.

In various implementations, the method 500 further includes, after playing the occlusion notification, playing, via the one or more speakers in response to detecting clearing of the occlusion, a clearing notification. Thus, in various implementations, the method 500 includes, after playing the occlusion notification, receiving, from the image sensor, a second image of the physical environment, detecting, based on the second image of the physical environment, clearing of the occlusion, and playing, via the one or more speakers in response to detecting clearing of the occlusion, a clearing notification.

In various implementations, the clearing notification is a series of tones. In various implementations, the occlusion notification and the clearing notification are different. However, in various implementations, the occlusion notification and the clearing notification are complementary. For example, in various implementations, the occlusion notification is a descending arpeggio and the clearing notification is an ascending arpeggio (e.g., of the same tones). In various implementations, the occlusion notification includes two tones in a minor interval and the clearing notification includes two tones in a major interval. In various implementations, the clearing notification is a verbal notification (e.g., "Occlusion cleared.")

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device including one or more image sensors, one or more speakers, one or more processors, and non-transitory memory:

receiving, from the one or more image sensors, an image of a physical environment;

detecting, based on the image of the physical environment, an occlusion at least partially occluding the one or more image sensors;

classifying the occlusion as one of a plurality of occlusion types, wherein the one or more image sensors includes a left image sensor and a right image sensor and the plurality of occlusion types includes a left image sensor occlusion type associated with occlusion of the left image sensor and a right image sensor occlusion type associated with occlusion of the right image sensor; and playing, via the one or more speakers, an occlusion notification based on the classification, wherein the one or more speakers includes a left speaker and a right speaker and playing the occlusion notification based on the classification includes playing the occlusion notification in one of the left speaker or the right speaker.

2. The method of claim 1, wherein the plurality of occlusion types includes a plurality of object type occlusion types and playing the occlusion notification is based on classification of the occlusion as one of the plurality of object type occlusion types.

3. The method of claim 2, wherein the plurality of object type occlusion types includes a hair occlusion type and playing the occlusion notification is based on classification of the occlusion as the hair occlusion type.

4. The method of claim 2, wherein the plurality of object type occlusion types includes at least one of a dirt occlusion type or a water occlusion type and playing the occlusion notification is based on classification of the occlusion as the dirt occlusion type or the water occlusion type.

5. The method of claim 1, wherein the plurality of occlusion types includes an opaque occlusion type and a transparent occlusion type and playing the occlusion notification is based on classification of the occlusion as the opaque occlusion type or the transparent occlusion type.

6. The method of claim 1, wherein the plurality of occlusion types includes a first occlusion type associated with level of occlusion below a threshold and a second occlusion type associated with level of occlusion above the threshold and playing the occlusion notification is based on classification of the occlusion as the first occlusion type or the second occlusion type.

7. The method of claim 6, wherein playing the occlusion notification based on the classification includes playing the occlusion notification in response to classifying the occlusion as the second occlusion type.

8. The method of claim 1, wherein the image of the physical environment has a device field-of-view greater than a user field-of-view and wherein the occlusion is detected outside an area of the user field-of-view.

9. The method of claim 1, wherein playing the occlusion notification includes playing the occlusion notification in one of the left speaker or the right speaker without playing the occlusion notification in the other of the left speaker or the right speaker.

10. The method of claim 1, wherein the occlusion notification includes one or more tones.

11. The method of claim 1, wherein the occlusion notification is a verbal notification.

12. The method of claim 11, wherein the verbal notification includes instructions for clearing the occlusion.

13. The method of claim 1, wherein classifying the occlusion includes applying a neural network to the image of the physical environment.

14. The method of claim 1, further comprising, after playing the occlusion notification:

receiving, from the one or more image sensors, a second image of the physical environment;

detecting, based on the second image of the physical environment, clearing of the occlusion; and playing, via the one or more speakers in response to detecting clearing of the occlusion, a clearing notification.

15. A non-transitory memory storing one or more programs, which, when executed by one or more processors of a device including one or more image sensors and one or more speakers cause the device to:

receive, from the one or more image sensors, an image of a physical environment;

detect, based on the image of the physical environment, an occlusion at least partially occluding the one or more image sensors;

classify the occlusion as one of a plurality of occlusion types, wherein the one or more image sensors includes a left image sensor and a right image sensor and wherein the plurality of occlusion types includes a left image sensor occlusion type associated with occlusion of the left image sensor and a right image sensor occlusion type associated with occlusion of the right image sensor; and play, via the one or more speakers, an occlusion notification based on the classification, wherein the one or more speakers includes a left speaker and a right speaker and wherein playing the occlusion notification based on the classification includes playing the occlusion notification in one of the left speaker or the right speaker.

16. A device comprising:
one or more image sensors;
one or more speakers;
a non-transitory memory; and
one or more processors to:

receive, from the one or more image sensors, an image of a physical environment;

detect, based on the image of the physical environment, an occlusion at least partially occluding the one or more image sensors;

classify the occlusion as one of a plurality of occlusion types, wherein the one or more image sensors includes a left image sensor and a right image sensor and wherein the plurality of occlusion types includes a left image sensor occlusion type associated with occlusion of the left image sensor and a right image sensor occlusion type associated with occlusion of the right image sensor; and play, via the one or more speakers, an occlusion notification based on the classification, wherein the one or more speakers includes a left speaker and a right speaker and wherein playing the occlusion notification based on the classification includes playing the occlusion notification in one of the left speaker or the right speaker.

17. The device of claim 16, comprising a left frame for insertion in a left ear of a user and a right frame for insertion in a right ear of the user, wherein the left frame is coupled to the left image sensor and the left speaker and the right frame is coupled to the right image sensor and the right speaker.

18. The device of claim 16, wherein the one or more processors are further to, after playing the occlusion notification:

receive, from the one or more image sensors, a second image of the physical environment;

detect, based on the second image of the physical environment, clearing of the occlusion; and play, via the one or more speakers in response to detecting clearing of the occlusion, a clearing notification.

19. The device of claim 16, wherein the image of the physical environment has a device field-of-view greater than a user field-of-view and wherein the occlusion is detected outside an area of the user field-of-view.

20. The device of claim 16, wherein playing the occlusion notification includes playing the occlusion notification in one of the left speaker or the right speaker without playing the occlusion notification in the other of the left speaker or the right speaker.

* * * * *